United States Patent
Yoshitomi et al.

(10) Patent No.: US 10,132,642 B2
(45) Date of Patent: Nov. 20, 2018

(54) UNIT SETTING APPARATUS AND UNIT SETTING METHOD

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Naoto Yoshitomi, Kariya (JP); Jian Hu, Kariya (JP); Shota Satomura, Kariya (JP); Yusuke Fujimaki, Nisshin (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/166,980

(22) Filed: May 27, 2016

(65) Prior Publication Data

US 2016/0349070 A1 Dec. 1, 2016

(30) Foreign Application Priority Data

May 29, 2015 (JP) .................... 2015-110567

(51) Int. Cl.
*G01C 21/00* (2006.01)
*G01C 21/36* (2006.01)
*G06K 9/00* (2006.01)

(52) U.S. Cl.
CPC ..... *G01C 21/3602* (2013.01); *G01C 21/3697* (2013.01); *G06K 9/00818* (2013.01)

(58) Field of Classification Search
CPC .............. G08G 1/0967; G08G 1/0968; G06K 9/00818; G01C 21/3602; G01C 21/3697

(Continued)

(56) References Cited

U.S. PATENT DOCUMENTS 6,040,766 A * 3/2000 Lubke .................. B60Q 1/143
340/438
2007/0177014 A1 8/2007 Frenzel et al.
(Continued)

FOREIGN PATENT DOCUMENTS

| JP | 2000266557 A | * | 9/2000 | |
|---|---|---|---|---|
| JP | 2005222485 A | * | 8/2005 | |
| WO | WO-0005091 A1 | * | 2/2000 | ............. B60K 31/00 |

OTHER PUBLICATIONS

Machine Translation: Saito, JP 2000266557 A, Sep. 2000, Japanese Patent Publication.*

(Continued)

*Primary Examiner* — Kimberly S Berona
*Assistant Examiner* — Nadeem Odeh
(74) *Attorney, Agent, or Firm* — Knobbe, Martens, Olson & Bear, LLP

(57) ABSTRACT

A unit setting apparatus sets a unit of distance used in a vehicle. A unit is set, which is indicated by map unit information, as a unit to be used, when a map unit acquisition section has acquired the map unit information. A unit is set, which is indicated by operation unit information, as a unit to be used, when the map unit acquisition section has not acquired the map unit information, and an operation unit acquisition section has acquired operation unit information. A unit is set, which is indicated by sign unit information, as a unit to be used, when the map unit acquisition section has not acquired the map unit information, the operation unit acquisition section has not acquired the operation unit information, and a sign unit acquisition section has acquired the sign unit information.

8 Claims, 2 Drawing Sheets

(58) Field of Classification Search
USPC .......................................................... 701/409
See application file for complete search history.

(56) References Cited

U.S. PATENT DOCUMENTS

| | | | |
|---|---|---|---|
| 2008/0137908 A1* | 6/2008 | Stein .................. | G06K 9/00818 382/103 |
| 2012/0245832 A1* | 9/2012 | Meis ...................... | G08G 1/167 701/116 |
| 2015/0213319 A1 | 7/2015 | Frenzel et al. | |
| 2015/0215550 A1 | 7/2015 | Frenzel et al. | |

OTHER PUBLICATIONS

Machine Translation: Amano, JP 2005222485 A, Aug. 2005, Japanese Patent Publication.*
Wikipedia, Comparison of European Road Signs, Apr. 17, 2015, Wikipedia Online Encyclopedia.*

* cited by examiner

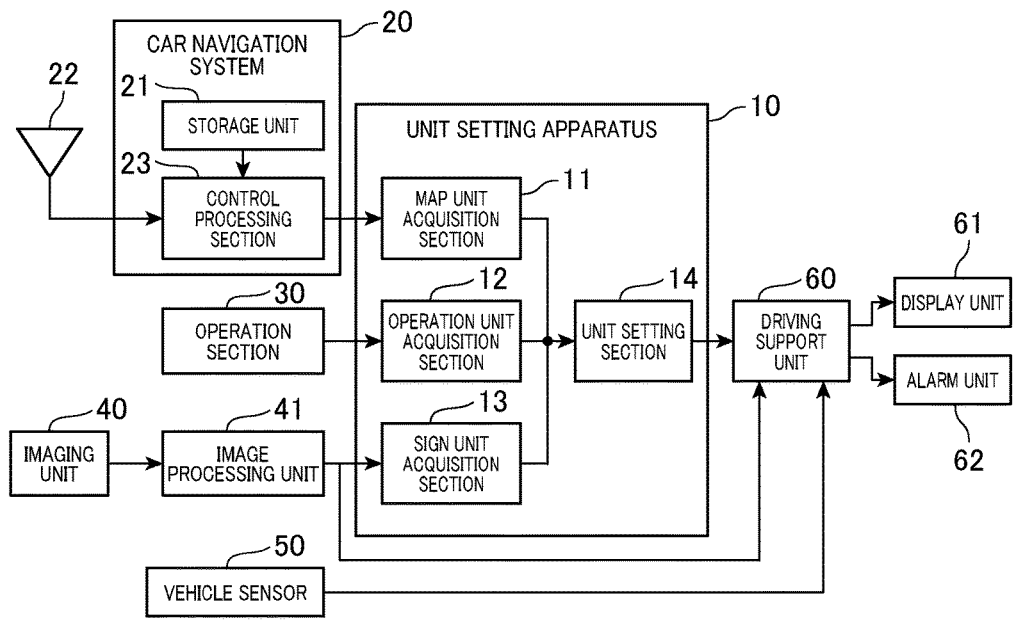

UNIT SETTING APPARATUS AND UNIT SETTING METHOD

CROSS-REFERENCE TO RELATED APPLICATION

This application is based on and claims the benefit of priority from earlier Japanese Patent Application No. 2015-110567 filed May 29, 2015, the description of which is incorporated herein by reference.

BACKGROUND

Technical Field

The present invention relates to a unit setting apparatus that sets a unit of speed used in a vehicle, and a unit setting method.

Related Art

Japanese Patent No. 4604088 discloses an apparatus that recognizes a traffic sign from an image around a vehicle captured by an imaging unit mounted in the vehicle. In the vehicle including the apparatus disclosed in No. 4604088 gives the driver display or alarm based on the traffic sign.

Some countries use km/s (km/h), which is a kilometer unit, as a unit for speed signs, and some countries use mps (mile per second) (mph, mile per hour), which is a mile unit, as a unit for speed signs. When the speed of a vehicle is compared with a limiting speed recognized from a speed sign to give the driver a display or alarm, if a unit of the speed sign and a unit set in the vehicle are different from each other, an alarm is issued though the speed of the vehicle has not reached the limiting speed, or an alarm is not issued when the speed of the vehicle has exceeded the limiting speed.

SUMMARY

An embodiment provides a unit setting apparatus and a unit setting method that can set a unit of distance with high accuracy.

As an aspect of the embodiment, a unit setting apparatus is provided which sets a unit of distance used in a vehicle. The apparatus includes: a map unit acquisition section that acquires map unit information indicating the unit according to a position of the vehicle and map data; an operation unit acquisition section that accepts an operation for specifying the unit to acquire operation unit information indicating the unit; a sign unit acquisition section that acquires sign unit information indicating the unit based on an image of a traffic sign acquired from an imaging unit mounted in the vehicle; and a unit setting section that sets a unit indicated by the map unit information as a unit to be used when the map unit acquisition section has acquired the map unit information, sets a unit indicated by the operation unit information as a unit to be used when the map unit acquisition section has not acquired the map unit information, and the operation unit acquisition section has acquired the operation unit information, and sets a unit indicated by the sign unit information as a unit to be used when the map unit acquisition section has not acquired the map unit information, the operation unit acquisition section has not acquired the operation unit information, and the sign unit acquisition section has acquired the sign unit information.

BRIEF DESCRIPTION OF THE DRAWINGS

In the accompanying drawings:

FIG. 1 is a diagram showing a configuration of a unit setting apparatus;

FIG. 2 is a diagram showing relationships between countries, units, and passing prohibition signs;

DETAILED DESCRIPTION OF THE PREFERRED EMBODIMENTS

Figure 3:
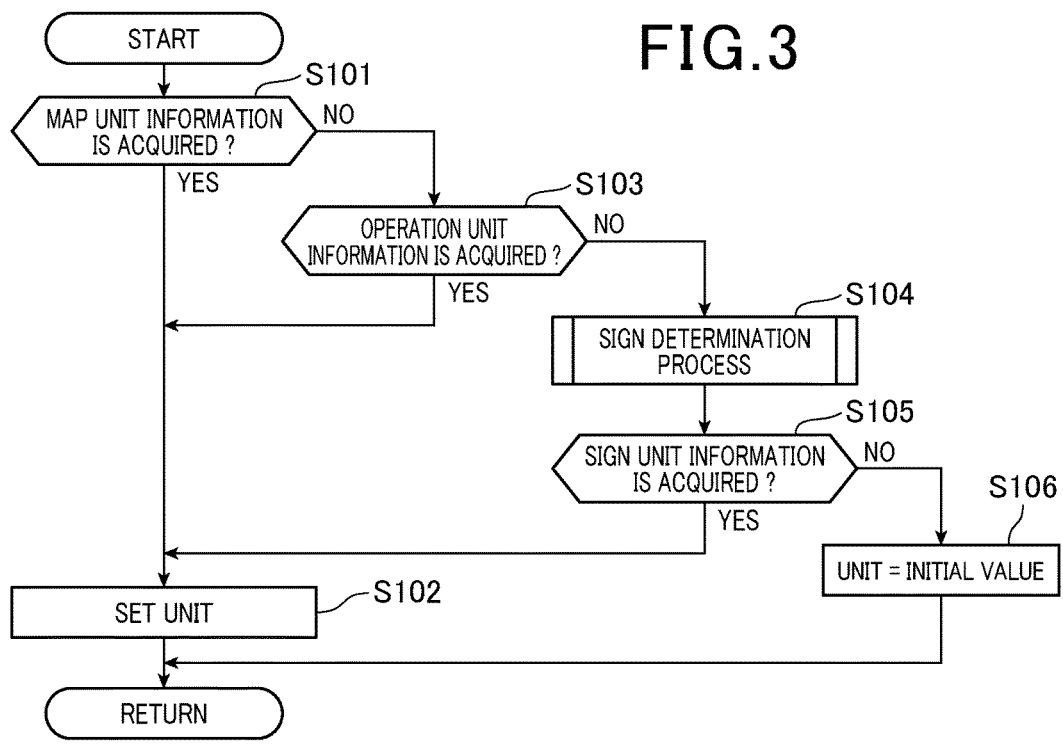
FIG. 3 is a flowchart showing a procedure performed by the unit setting apparatus.

With reference to the accompanying drawings, hereinafter is described an embodiment according to the present invention.

A unit setting apparatus 10 according to the embodiment is mounted in a vehicle and sets a unit of speed used in the vehicle to km/s (km/h) or mps (mph). In FIG. 1, the unit setting apparatus 10 is a computer including a CPU, a ROM, a RAM, and an I/O, or part of the computer. In the unit setting apparatus 10, the CPU executes a program installed in the ROM to perform functions of the unit setting apparatus 10.

The unit setting apparatus 10 is connected to a car navigation system 20 so as to communicate therewith. A map unit acquisition section 11 of the unit setting apparatus 10 acquires a unit based on information acquired from the car navigation system 20.

The car navigation system 20 includes a storage unit 21. The storage unit 21 stores map data. The map data has a mesh structure which is divided into rectangular areas having predetermined widths in latitude and longitude. Each mesh is associated with country information indicating a country or a region. In addition, the map data includes road information for route searching. The car navigation system 20 is connected with an antenna 22 and receives signals transmitted from Global Positioning System satellites through the antenna 22. A control processing section 23 calculates the latitude and the longitude indicating the position of the vehicle based on the signal to determine which of the meshes of the map data includes the position of the vehicle.

The car navigation system 20 accepts operation by the driver or the like and searches for a route to a destination by using the map data to guide the driver by using a display unit, not shown, or the like. In addition, a map is displayed by using the map data. Since these processes are known, detailed descriptions thereof are omitted.

The control processing section 23 transmits country information associated with a mesh including the position of the vehicle to the map unit acquisition section 11. The map unit acquisition section 11 reads a unit from the ROM based on the received country information to acquire the unit as map unit information. The relationship between countries and units are shown in FIG. 2. Japan uses km/s (km/h), which is a kilometer unit, as a unit. In Europe, some countries use km/s (km/h) as a unit, and some countries use mps (mph), which is a mile unit, as a unit. Specifically, the United Kingdom, the Republic of Malta, and the Republic of Cyprus use mps (mph), and other countries use km/s (km/h).

An operation section 30 is a switch which can switch, for example, between a unit of km/s (km/h) and a unit of mps (mph) in a two-valued manner and accepts operation by the driver or the like of the vehicle. A signal based on this operation is inputted into an operation unit acquisition section 12 of the unit setting apparatus 10. The operation unit acquisition section 12 acquires the signal based on the operation as operation unit information indicating a unit.

An imaging unit 40 captures an image of a scene in front of the vehicle in the traveling direction and transmits the image to an image processing unit 41. The image processing unit 41 extracts a traffic sign from the captured image. In the present embodiment, at least a speed limit sign (which shows a limit value within a red circle and is common to each country) and a passing prohibition sign.

The relationship between passing prohibition signs used in countries, the countries in which the passing prohibition signs are used, traffic partitions used in the countries, and distance units of numerical values shown in traffic signs is described with reference to FIG. 2. Note that, in FIG. 2, hatching shows portions colored red.

As shown in FIG. 2, in Japan, left-hand traffic is executed, and km/s (km/h) is used as a unit. In passing prohibition signs, a transversal line crossing the sign diagonally and a pair of arrows reminding of passing are shown.

In Europe, some countries have right-hand traffic, and some countries have left-hand traffic. For example, the United Kingdom, the Republic of Malta, the Republic of Cyprus, and the Republic of Ireland have left-hand traffic, and other counties have right-hand traffic. All the countries having right-hand traffic in Europe use km/s (km/h) as a unit. In passing prohibition signs, not a transversal line but a pair of vehicle icons is shown. A left-side vehicle icon is colored red, and a right-side vehicle icon is colored black.

The United Kingdom, the Republic of Malta, and the Republic of Cyprus, which have left-hand traffic, use mps (mph) as a unit of speed. In passing prohibition signs, not a transversal line but a pair of vehicle icons is shown. A left-side vehicle icon is colored black, and a right-side vehicle icon is colored red.

The Republic of Ireland, which has left-hand traffic, uses km/s (km/h) as a unit of speed. In passing prohibition signs, a pair of vehicles colored black and a transversal line crossing diagonally so as to pass over the right-hand vehicle are shown.

The image processing unit 41 generates an edge image in which the outline of the object in the image is enhanced, and extracts an area including an object whose outline is a circle as a sign candidate area based on the edge image. Next, the image processing unit 41 determines the type of traffic signs, to which the extracted sign candidate areas respectively correspond. At least, the image processing unit 41 determines whether each of the extracted sign candidate areas corresponds to a speed limit sign (which shows a limit value within a red circle and is common to each country) or a passing prohibition sign (four types shown in FIG. 2). Note that the determination is achieved by using a linear discriminator hierarchically. The linear discriminator determines, in a speed limit sign, a numerical value indicating a speed limit value shown in the sign. The linear discriminator determines, in a passing prohibition sign, whether or not there is a transversal line that crosses the sign diagonally, whether or not there is a pair of vehicle icons, whether or not right-side vehicle icon of the pair of vehicle icons is red, and whether or not left-side vehicle icon of the pair of vehicle icons is red. Then, the linear discriminator outputs information on the type of a traffic sign, which is an identification result, to a sign unit acquisition section 13 of the unit setting apparatus 10. The sign unit acquisition section 13 reads a unit of speed from the ROM based on the type of the traffic sign received from the image processing unit 41, and acquires the unit as sign unit information.

A unit setting section 14 acquires map unit information, operation unit information, and sign unit information from the map unit acquisition section 11, the operation unit acquisition section 12, and the sign unit acquisition section 13, respectively. Then, the unit setting section 14 sets a unit used in the vehicle based on the acquired information. Specifically, if having acquired the map unit information from the map unit acquisition section 11, the unit setting section 14 sets the unit indicated by the map unit information as a unit used in the vehicle. If not having acquired the map unit information from the map unit acquisition section 11, and having acquired the operation unit information from the operation unit acquisition section 12, the unit setting section 14 sets the unit indicated by the operation unit information as a unit used in the vehicle. If not having acquired the map unit information from the map unit acquisition section 11, and not having acquired the operation unit information from the operation unit acquisition section 12, and if having acquired the sign unit information from the sign unit acquisition section 13, the unit setting section 14 sets the unit indicated by the sign unit information as a unit used in the vehicle. That is, the map unit information acquired from the map unit acquisition section 11 has the highest priority, and the sign unit information acquired from the sign unit acquisition section 13 has the lowest priority. Note that if not having acquired information on a unit from any of the map unit acquisition section 11, the operation unit acquisition section 12, and the sign unit acquisition section 13, the unit setting section 14 sets an initial value as a unit. This initial value may be set depending on, for example, the position of the steering wheel of the vehicle. In addition, typical countries and regions using units may be previously set so that a unit used in the corresponding county or region may be set as the initial value.

The unit setting section 14 transmits the set unit to a driving support unit 60. The driving support unit 60 further acquires a result of recognition of a speed limit sign and a speed of the vehicle, which is a detection value of a vehicle sensor 50, from the image processing unit 41. Then, the image processing unit 41 compares the speed of the vehicle with a speed shown in the speed limit sign in a state where the unit of the speed shown in the speed limit sign is set as a unit set by the unit setting apparatus 10, to determine whether or not the speed of the vehicle has exceeded the limit speed. If the speed of the vehicle is more than the limit speed by at least a predetermined value, the unit setting section 14 notifies the driver by using a display unit 61 and an alarm unit 62. The display unit 61 may display the limit speed.

Next, a process performed by the unit setting section 10 is described with reference to a flowchart shown in FIG. 3. The process according to the flowchart shown in FIG. 3 is performed at predetermined control periods. The control period may be the same as or different from that of the car navigation system 20, and may be the same as or different from that of the image processing unit 41.

First, the map unit acquisition section 11 determines whether or not the map unit acquisition section 11 has acquired map unit information (S101). If the map unit information has been acquired (S101: YES), the map unit acquisition section 11 sets the unit indicated by the map unit information as a unit to be used (S102) and ends the present process. If the map unit information has not been acquired (S101: NO), the operation unit acquisition section 12 accepts an operation for inputting a unit through the operation section 30, and then determines whether or not the operation unit acquisition section 12 has acquired operation unit information (S103). If the operation unit information has been acquired (S103: YES), the unit setting section 14 sets the unit indicated by the operation unit information as a unit to be used (S102), and ends the present process. If the operation unit information has not been acquired (S103: NO), the sign unit acquisition section 13 performs a sign determination process by using an acquired result of recognition of a traffic sign (S104).

If the sign unit information has been acquired in the sign determination process (S105: YES), the unit setting section 14 sets the unit indicated by the sign unit information as a unit to be used (S102), and ends the present process. In contrast, if the sign unit information has not been acquired in the sign determination process (S105: NO), the unit setting section 14 sets the initial value as a unit (S106), and ends the present process.

Figure 4:
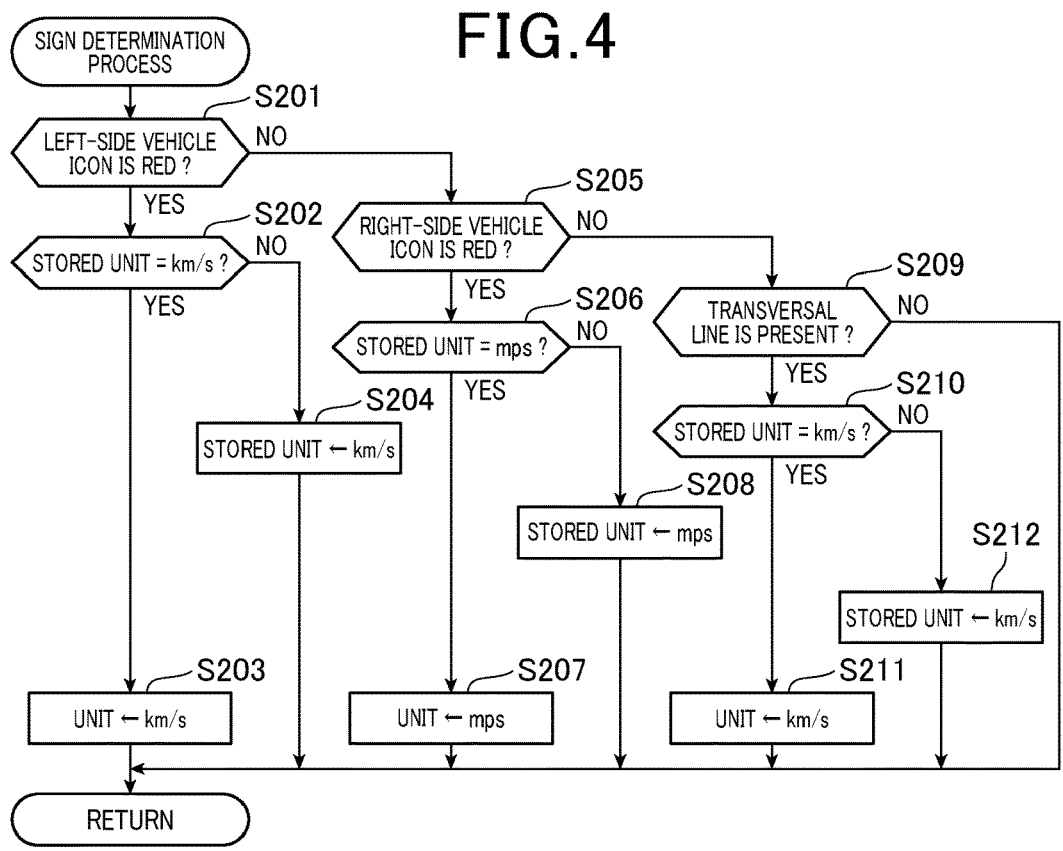
FIG. 4 is a subroutine of a sign determination process.

FIG. 4 is a subroutine of the sign determination process shown in FIG. 3. First, the unit setting section 14 determines whether or not a left-side vehicle icon is colored red (S201). If the left-side vehicle icon is colored red (S201: YES), the unit setting section 14 determines whether or not a stored unit is km/s (km/h) (S202). This stored unit is a unit determined in the previous control period and has been temporarily set. If positive determination is made in S202, the stored unit is assumed to have higher reliability. If the stored unit is km/s (km/h) (S203: YES), the unit setting section 14 determines that the unit is km/s (km/h) (S203), and ends the process of the subroutine. If the stored unit is not km/s (km/h) (S203: NO), the unit setting section 14 overwrites the stored unit with km/s (km/h) (S204), and ends the process of the subroutine.

If the left-side vehicle icon is not colored red (S201: NO), the unit setting section 14 determines whether or not the right-side vehicle icon is colored red (S205). If the right-side vehicle icon is colored red (S205: YES), the unit setting section 14 determines whether or not the stored unit is mps (mph) (S206). If the stored unit is mps (mph) (S206: YES), the unit setting section 14 determines that the unit is mps (mph) (S207), and ends the process of the subroutine. If the stored unit is not mps (mph) (S206: NO), the unit setting section 14 overwrites the stored unit with mps (mph) (S208), and ends the process of the subroutine.

If the right-side vehicle icon is not colored red (S205: NO), the unit setting section 14 determines whether or not the traffic sign has a transversal line (S209). If the traffic sign has a transversal line (S209: YES), the unit setting section 14 determines whether or not the stored unit is km/s (km/h) (S210). If the stored unit is km/s (km/h) (S210: YES), the unit setting section 14 determines that the unit is km/s (km/h) (S211), and ends the process of the subroutine. If the stored unit is not km/s (km/h) (S210: NO), the unit setting section 14 overwrites the stored unit with km/s (km/h) (S212), and ends the process of the subroutine.

If the traffic sign does not have a transversal line (S209: NO), the unit setting section 14 ends the process of the subroutine. In this case, the stored unit is not deleted so that a unit can be determined when a traffic sign having the same unit as the stored unit is recognized in later control periods.

The stored unit is overwritten in the steps S204, S208, and S212. However, when a different unit has been stored, an additional unit may be stored. Even when such a process is performed, a unit can be determined from a sign subsequently recognized. The stored unit may be reset when a predetermined time period has passed from the time when the stored unit is stored. In both cases where the left-side vehicle icon is colored red and where the traffic sign has a transversal line, the stored unit is set to km/s (km/h). Hence, not the type of a unit but the type of a sign may be used as the stored unit.

According to the configuration described above, the unit setting section 10 according to the present embodiment can provide the following advantages.

When a unit is set from an imaged traffic sign, the unit is likely to be erroneously set due to false recognition of the traffic sign. In addition, in rain or at night, it is difficult to recognize a traffic sign. However, according to the present embodiment, since one of the map unit information acquired by the map unit acquisition section 11 and the operation unit information acquired by the operation unit acquisition section 12 is used in preference to the sign unit information acquired by the sign unit acquisition section 13, accuracy in setting a unit can be improved.

When the driver or the like performs input operation of the operation section 30 to set a unit, incorrect input may occur. Due to the unit based on the incorrect input, the driver is erroneously notified via the display unit 61 and the alarm unit 62. However, since the map unit information based on country information acquired by the map unit acquisition section 11 is preferentially used, accuracy in setting a unit can be improved.

When a vehicle is running in a tunnel or indoors, the position of the vehicle is difficult to detect. Hence, when country information is identified by using the position of the vehicle and the map data to set a unit based on the country information, the unit may not be set. However, according to the present embodiment, when the map unit acquisition section 11 has not acquired map unit information, the operation unit acquisition section 12 or the sign unit acquisition section 13 can acquire a unit. Hence, situations in which a unit cannot be acquired can be reduced.

Some vehicles do not include the car navigation system 20. In such vehicles, although the map unit acquisition section 11 cannot acquire map unit information, one of the operation unit acquisition section 12 and the sign unit acquisition section 13 can set a unit. Hence, in various vehicles, a unit can be set.

When the type of a traffic sign is determined by using the image processing unit 41, in rain or at night, false recognition easily occurs. This is noticeable when the color is identified. In the present embodiment, when a unit is set based on a traffic sign, the unit is set on condition that the same traffic sign is recognized multiple times. Hence, accuracy in setting a unit can be improved.

<Modifications>

In the above embodiment, each mesh is associated with a country in the map data having a mesh structure. However, regions indicating countries may be sectionalized by boundary lines to determine a country based on the direction in which the vehicle is present with respect to the boundary line. Countries may be associated with the linked data indicating roads included in the road data to identify a country depending on the road in which the vehicle is running. The map data may have another data structure. That is, any modification can be utilized if a country can be identified by the position of the vehicle.

The map unit acquisition section 11 acquires country information from the car navigation system 20 to read a unit based on the country information. However, a unit may be acquired from the car navigation system 20.

In the above embodiment, map data is stored in the storage unit 21 of the car navigation system 20. However, the map data may be acquired through communication lines. In such a case, the map data is not likely to be acquired according to the communication circumstances. Also in this case, as in the case of the above embodiment, the map unit acquisition section 11 cannot acquire a unit based on the country information. Hence, the unit setting apparatus 10 sets a unit used in the vehicle based on the operation unit acquisition information acquired by the operation unit acquisition section 12 or sign unit information acquired by the sign unit acquisition section 13.

In the above embodiment, one of a kilometer unit and a mile unit is set. However, another unit may be used.

In the above embodiment, a unit of speed is set. However, a unit of distance may be set. If the unit of distance is set to km, the unit of speed is set to km/s (km/h). If the unit of distance is set to mile, the unit of speed is set to mps (mph).

In the sign determination process, a unit is determined when the same sign is recognized twice. However, a unit may be determined when the same sign is recognized three or more times. Alternatively, a unit may be determined when the sign is recognized once.

In the above embodiment, notification is made to the driver by using a value in the speed limit sign and a speed of the vehicle. However, if the vehicle has a cruise control function or an automated driving function, the unit of a value in the speed limit sign may be set as a unit set by the unit setting apparatus 10 to control the speed of the vehicle so as to be the value in the speed limit sign.

It will be appreciated that the present invention is not limited to the configurations described above, but any and all modifications, variations or equivalents, which may occur to those who are skilled in the art, should be considered to fall within the scope of the present invention.

Hereinafter, aspects of the above-described embodiments will be summarized.

As an aspect of the embodiment, a unit setting apparatus (10) is provided which sets a unit of distance used in a vehicle. The apparatus includes: a map unit acquisition section (11) that acquires map unit information indicating the unit according to a position of the vehicle and map data; an operation unit acquisition section (12) that accepts an operation for specifying the unit to acquire operation unit information indicating the unit; a sign unit acquisition section (13) that acquires sign unit information indicating the unit based on an image of a traffic sign acquired from an imaging unit (40) mounted in the vehicle; and a unit setting section (14) that sets a unit indicated by the map unit information as a unit to be used when the map unit acquisition section has acquired the map unit information, sets a unit indicated by the operation unit information as a unit to be used when the map unit acquisition section has not acquired the map unit information, and the operation unit acquisition section has acquired the operation unit information, and sets a unit indicated by the sign unit information as a unit to be used when the map unit acquisition section has not acquired the map unit information, the operation unit acquisition section has not acquired the operation unit information, and the sign unit acquisition section has acquired the sign unit information.

When a unit is set from an imaged traffic sign, the unit is likely to be erroneously set due to false recognition of the traffic sign. In addition, in rain or at night, it is difficult to recognize a traffic sign. However, according to the present embodiment, since one of the map unit information acquired by the map unit acquisition section and operation unit information acquired by the operation unit acquisition section is used in preference to the sign unit information acquired by the sign unit acquisition section, accuracy in setting a unit can be improved.

When the driver or the like performs input operation of the operation section to set a unit, incorrect input may occur. However, since the map unit information that is acquired by the map unit acquisition section and is based on the position and the map data is preferentially used, accuracy in setting a unit can be improved.

When the vehicle is running in a tunnel or indoors, the position of the vehicle is difficult to detect. Hence, when trying to set a unit by using the position of the vehicle and the map data, the unit may not be able to be set. However, according to the above embodiment, when the map unit acquisition section has not acquired map unit information, the operation unit acquisition section or the sign unit acquisition section can acquire a unit. Hence, situations in which a unit cannot be acquired can be reduced.

What is claimed is:

1. A unit system setting apparatus that sets a unit system for indicating distance used in a vehicle equipped with a storage unit storing map data, a driver input apparatus and an imaging unit, the unit system setting apparatus comprising:
   a map unit system acquisition section operably connected to the storage unit, which is configured to acquire, by a processor, map unit system information indicating a first candidate unit system according to a position of the vehicle and the map data;
   an operation unit system acquisition section operably connected to the driver input apparatus, which is configured to acquire, by the processor, operation unit system information indicating a second candidate unit system according to operation inputs from the driver input apparatus;
   a sign unit system acquisition section that operably connected to the imaging unit, which is configured to acquire, by the processor, sign unit system information indicating a third candidate unit system based on an image of a traffic sign acquired by the imaging unit; and
   a unit system selecting section that is configured to select, by the processor, one of the first, second or third candidate unit systems as the unit system used in the vehicle according to the following order:
   (1) selecting the first candidate unit system over the second and third candidate unit systems, when the map unit system acquisition section has acquired the map unit system information,
   (2) selecting the second candidate unit system over the first and third candidate unit systems, when the map unit system acquisition section has not acquired the map unit system information, and the operation unit system acquisition section has acquired the operation unit system information, and
   (3) selecting the third candidate unit system over the first and second candidate unit systems, when the map unit system acquisition section has not acquired the map unit system information, the operation unit system acquisition section has not acquired the operation unit system information, and the sign unit system acquisition section has acquired the sign unit system information.

2. The unit system setting apparatus according to claim 1, wherein
   the unit system is associated with country information indicating a country or a region, and
   the map unit system acquisition section acquires, by the processor, the country information based on the position and the map data to acquire the map unit system information based on the country information.

3. The unit system setting apparatus according to claim 2, wherein the unit system setting apparatus is connected to a car navigation system so as to communicate therewith, and the map unit system acquisition section acquires, by the processor, the country information from the car navigation system.

4. The unit system setting apparatus according to claim 1, wherein the unit system selecting section sets, by the processor, the unit system to one of a kilometer unit and a mile unit.

5. The unit system setting apparatus according to claim 4, wherein the traffic sign is a passing prohibition sign.

6. The unit system setting apparatus according to claim 5, wherein when the passing prohibition sign has a transversal line that diagonally crosses the passing prohibition sign, the sign unit system acquisition section acquires, by the processor, a kilometer unit as the sign unit system information.

7. The unit system setting apparatus according to claim 5, wherein when the passing prohibition sign has a pair of vehicle icons, if the vehicle icon colored red is positioned at right side, the sign unit system acquisition section acquires, by the processor, a mile unit as the sign unit system information, and if the vehicle icon colored red is positioned at left side, the sign unit system acquisition section acquires, by the processor, a kilometer unit as the sign unit system information.

8. A unit system setting method of setting a unit system for indicating distance used in a vehicle equipped with a storage unit storing map data, a driver input apparatus and an imaging unit, the method, when executed by a processor, comprising:

acquiring map unit system information, from the storage unit, indicating a first candidate unit system according to a position of the vehicle and the map data;

acquiring operation unit system information, via the driver input apparatus, indicating a second candidate unit system according to operation inputs from the driver input apparatus;

acquiring sign unit system information, using the imaging unit, indicating a third candidate unit system based on an image of a traffic sign acquired by the imaging unit mounted in the vehicle; and selecting one of the first, second or third candidate unit systems as the unit system used in the vehicle according to the following order:

(1) selecting the first candidate unit system over the second and third candidate unit systems, when the map unit system information has been acquired, (2) selecting the second candidate unit system over the first and third candidate unit systems, when the map unit system information has not been acquired and the operation unit system information has been acquired, and (3) selecting the third candidate unit system over the first and second candidate unit systems, when the map unit system information has not been acquired the operation unit system information has not been acquired, and the sign unit system information has been acquired.

* * * * *